Apr. 24, 1923.  1,453,183
J. E. ROBISON
GROUND GRIPPING CHAIN FOR AUTOMOBILE TIRES
Filed July 29, 1921  2 Sheets-Sheet 1
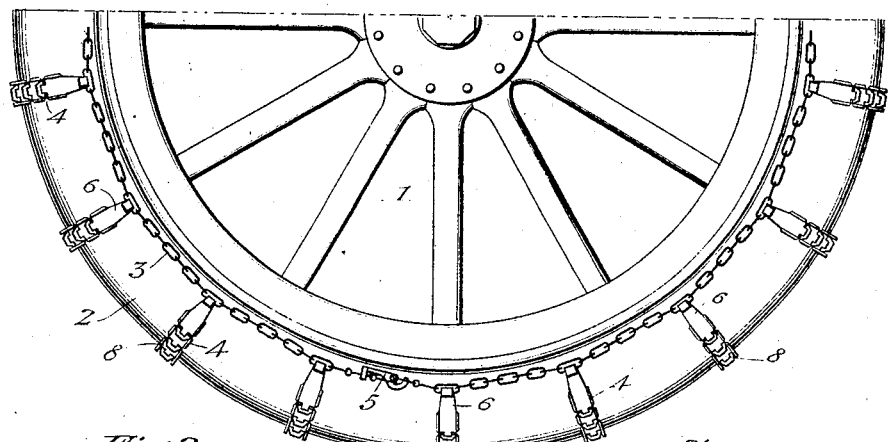
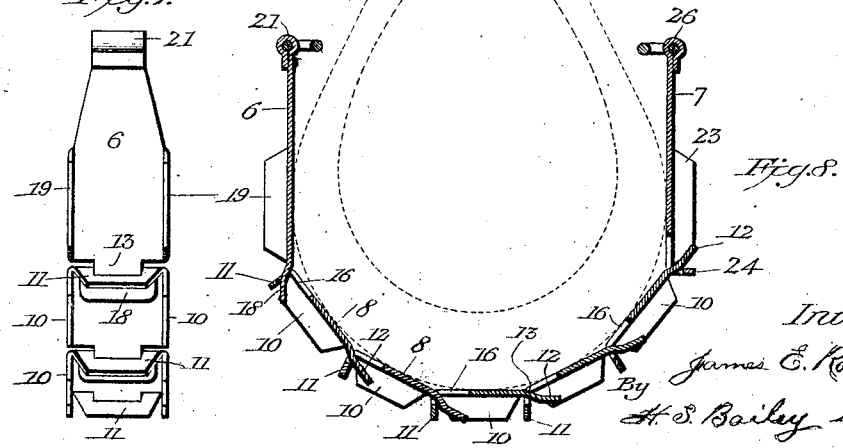
Inventor:
James E. Robison.
By H. S. Bailey Attorney.

Apr. 24, 1923.
J. E. ROBISON
1,453,183
GROUND GRIPPING CHAIN FOR AUTOMOBILE TIRES
Filed July 29, 1921    2 Sheets-Sheet 2
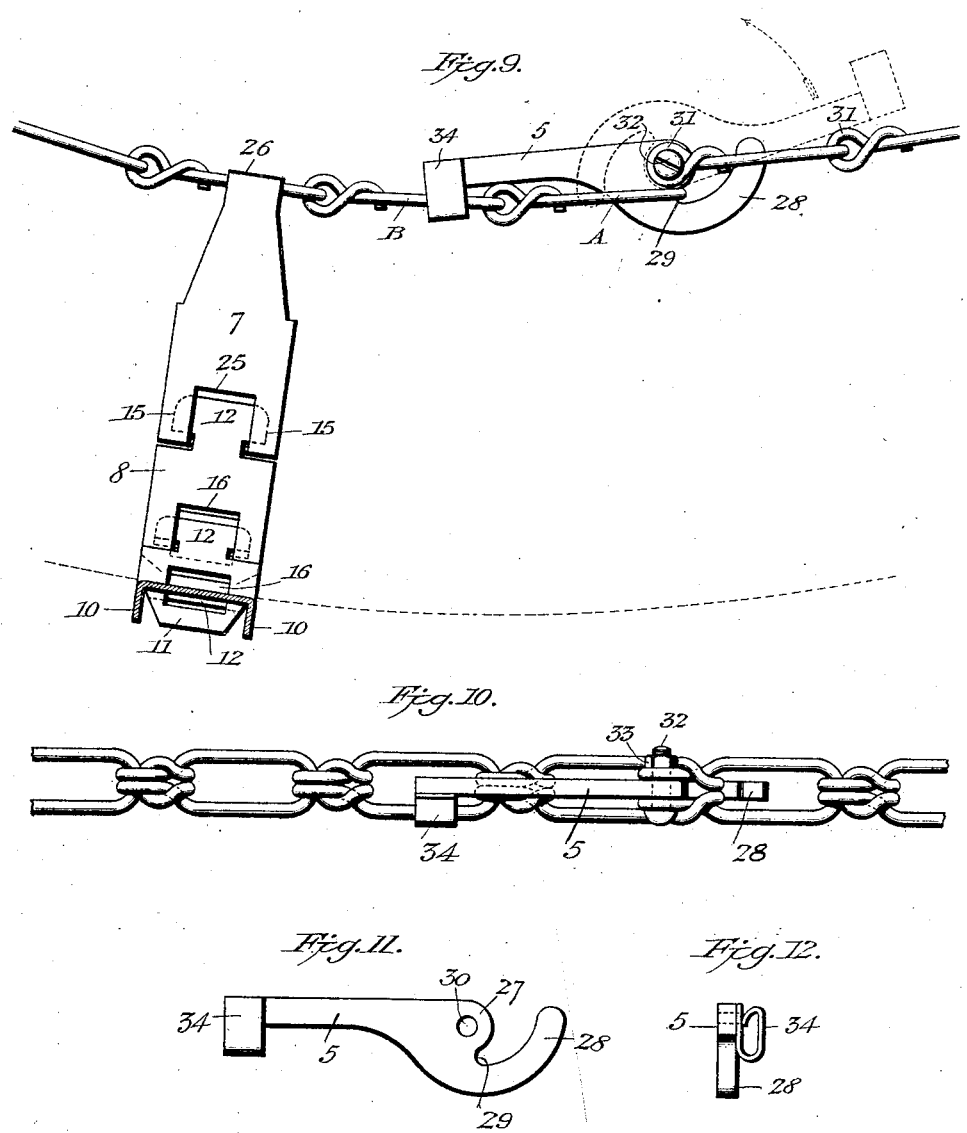
Inventor:
James E. Robison.
By H. S. Bailey  Attorney.

Patented Apr. 24, 1923.

1,453,183

UNITED STATES PATENT OFFICE.

JAMES E. ROBISON, OF DENVER, COLORADO.

GROUND-GRIPPING CHAIN FOR AUTOMOBILE TIRES.

Application filed July 29, 1921. Serial No. 488,362.

*To all whom it may concern:*

Be it known that I, JAMES E. ROBISON, a citizen of the United States of America, residing at the city and county of Denver and State of Colorado, have invented a new and useful Ground-Gripping Chain for Automobile Tires, of which the following is a specification.

This invention relates to improvements in ground gripping chains for automobile tires.

The object of the invention is to provide a ground gripping cross chain which is adapted not only to prevent side skidding, but which affords traction for backing or going ahead.

Further, to provide a cross chain which is made up of links or sections which are detachably connected, and which are formed with the road engaging lips for preventing side skidding and with lips which afford traction in backing or going ahead.

Further, to provide a cross chain made up of detachable links or sections having right angled road engaging lips which are effective during the life of the chain, there being no surfaces to wear smooth and thus permit slipping or skidding.

Further, to provide a cross chain, the links or sections of which are detachably connected and present smooth, flat, tire-engaging surfaces when placed around the tire, whereby injury to the tire is prevented These objects are accomplished by the mechanism illustrated in the accompanying drawings, in which:

Figure 1 is a side view of a portion of an automobile wheel showing the improved non-skid chain secured to the tire thereof.

Fig. 2 is a sectional view, through one of the cross chains extended in a straight line.

Fig. 3 is a bottom plan view of the cross chain.

Fig. 4 is a plan view of the blank from which one of the end sections of the cross chain is made.

Fig. 5 is a plan view of a blank from which one of the intermediate sections of the cross chain is made.

Fig. 6 is a plan view of a blank from which the other end section of the chain is made.

Fig. 7 is a side view of the cross chain as it appears when placed upon the tire.

Fig. 8 is a sectional view of the chain as it appears when surrounding the tire, the tire being shown in dotted lines.

Fig. 9 is a side view of a portion of one of the side chains showing a locking hook for connecting the ends of the said chain.

Fig. 10 is a plan view of a portion of one of the side chains shown in Figure 9; and Figures 11 and 12 are a side view and an end view, respectively, of the locking hook.

Referring to the accompanying drawings:

The numeral 1 indicates an automobile wheel, including the tire 2, and 3 and 4 indicate the side chain and cross chain, respectively, of the improved non-skid chain. The side chains 3, may be of any desired character. In Figure 1 is shown a side chain made of the common style of loop links, while in Figures 9 and 10 is shown a side chain in common use, and which is made up of specially constructed links, and in connection with either chain, I employ a locking hook 5, for connecting the ends of the side chains, as will be hereinafter described.

The cross chain 4, is made up of end sections 6 and 7, respectively, and intermediate links or sections 8, all of which are detachably connected and are constructed and arranged as follows: The links or sections of the improved cross chain are all stamped out of sheet steel of a thickness which will render them strong enough to resist the strain to which they are subjected. The blanks from which the intermediate links 8, are made, are of the form shown in Figure 5, each blank comprising a rectangular body portion 9, having wings or extensions 10, on two opposite sides, and a wing or extension 11, and a tongue 12, on the remaining two sides. The wings 10, are bent over at right angles to the body 9, along the dotted lines X, and the wing 11, is also bent over at the same angle, along the dotted line Y, and when so bent, the wings 10 and 11, present relatively sharp road-engaging lips which resist both a lateral sliding action and a sliding action at right angles to the lateral action, as will be understood by reference to the drawings.

The tongue 12, of each intermediate section 8, is in the form of a head portion which is connected to the body 9, by a short neck 13, the head and neck being formed by cutting narrow recesses 14, in from opposite side edges of the tongue where it joins the body 9, which produces lateral projections or flukes 15, on the head, as shown in Figure 5. A rectangular opening 16, is also formed in the body 9, and extends a slight distance into the wing 11, so that when the said wing is bent over at right angles to the body, a small part of the said opening 16, is in the wing or lip 11, while the major portion of the opening is in the body 9, as clearly shown in Figures 2 and 8.

In order to assemble the intermediate links or sections of the cross chain, the neck of each section is given a slight bend so that in a horizontal position the head will lie on a lower plane than the body, or a distance below the plane of the body equal to the thickness of the metal of which the section is made. The flukes 15, are then bent over at right angles to the head and the flukes of one section are then passed through the aperture 16, of the next succeeding section, after which the said flukes are pressed out flat again, thus locking each two sections together, but so as to have a swinging connection each with the other, as will be understood by reference to Figure 3. The number of intermediate links will vary with tires of different sizes, it being obvious that a six inch tire will require a greater number of intermediate links than will a three inch tire.

The links 6 and 7, are the connecting links between the cross chains and the side chains 3.

The blank from which the link 6, is formed comprises an elongated body portion 17, one end portion of which is wider than the remaining portion, and a tongue 18, is formed in the wider end portion, which is in all respects like the tongue 12, on the links 8. Extensions or wings 19, are formed on opposite sides of the widest part of this blank, and these wings are bent over at right angles along the dotted lines $a$, to form engaging lips which afford traction in backing or going ahead, particularly when passing through snow or over soft roads. The tongue 18, has flukes 20, which are bent over at right angles and passed through the opening 16, in one of the end intermediate links, after which the said flukes 20, are pressed out flat, thereby hinging the section 6, to the adjoining section 8. The free end of the section 6, is bent upon itself to form a hook 21, which is adapted to engage one of the links of one of the side chains 3. The blank from which the link or section 7 is formed, also comprises an elongated body portion 22, one end portion of which is wider than the remaining portion, and the wider portion is provided with opposite wings 23, which are bent over at right angles along the dotted lines $b$, to form engaging lips which are adapted to perform the same functions as the corresponding lips 19, on the section 6. The wider end of this section terminates in a wing 24, which is bent over at right angles along the dotted line $c$, and a rectangular opening 25, is formed in the body of the blank which extends a slight distance into the wing 24, and when the wing is bent over, the opening 25, is partly in the hood and partly in the wing. The flukes of the tongue of the last intermediate link are bent over at right angles and pass through the opening 25, of section 7, after which the said flukes are pressed down flat, thus connecting the link of section 7, with the adjoining link 8. The free end of the section 7, is bent over upon itself to form a hook 26, which is adapted to engage a link of one of the side chains 3.

In practice, a pair of side chains 3, are connected at suitable intervals by the improved cross chains 4, the hooks 21, of the links 6, engaging links of one of the side chains, while the hooks 26, of the links 7, engage links of the other side chain, the hooks, after engaging the side chains, being pressed into closed position as shown in Figure 8, to prevent disconnection from the side chains. The side chains, with their cross chains, are then placed around the tire in the usual manner, and the ends of each chain are connected by the couplers or fasteners 5, which are arranged as follows: Each coupler 5, comprises a straight metal bar, one end 27, of which is semi-circular in outline and terminates in a hook-shaped extension 28, the inner curved edge of which terminates at its inner end in a semi-circular crotch 29, and the curved end 27, of the bar is formed with a hole 30. The links of the side chain shown in Figure 9, are made from pieces of wire which are bent upon themselves to form spaced parallel side members, and the free end portions of each link are bent around to form eyes 31, the terminal end being then bent over and down between the side members of the link, as shown in Figures 9 and 10. In connecting the links, the looped end of one link passes through the eyes 31, of the adjoining link, and between the eyes 31, of one of the end links is placed the curved end 27, of the coupler 5, and a screw 32, is passed through the said eyes and through the hole 30, in the coupler, and forms a fulcrum for the said bar 5, and the screw is held in place by a nut 33. The opposite end of the coupler is provided with a spring catch 34, which is adapted to engage one of the links and hold the coupler in locked position, as shown in Figure 9.

In order to secure the two ends of each side chain after the said chains have been placed around the tire, the coupler is swung to the position shown in dotted lines, Figure 9, in which position the end of the hook 28, can be passed through the link A, on the opposite end of the chain. After passing the end of the hook through the said link A, the coupler is turned on its pivot 32, in the direction of the arrow until it occupies the position shown in full lines, Figure 9, and this movement of the coupler slides the end of the link A, on the curved edge of the hook until it engages the crotch 29, of the hook, the chain being tightened until the coupler reaches the limit of its movement, when the spring catch 34, is snapped over the side member of the link B, of the chain, thus holding the coupler locked, and thereby maintaining the chain under sufficient tension to hold the cross chains 4, against the tire.

In operation, the cross chains serve the double purpose of preventing side skidding, and also of affording traction, either in backing or going ahead. The side skidding is prevented by the engagement of the lips 11, of the under links with the road or pavement, and traction is afforded by the engagement of the lips 10, with the road or pavement, as the wheel rotates, and as these lips are about a quarter of an inch in depth and of comparatively slight thickness and hardness to resist wear, they present relatively sharp road engaging elements which remain effective during the whole life of the chain. The lips 19 and 23, of the end sections 6 and 7, of the cross chains, and the lips 10, of the adjoining links also afford traction in soft ground, where the tire sinks, or when snow is encountered, as these lips cut into the soft ground or snow, as the case may be, and prevent the wheel from spinning.

The present form of cross chain presents a series of lips or blades, which are always capable of gripping the ground, as against the flat links of the common form of cross chain which soon wear smooth and consequently offer little resistance against the skidding action of the wheel.

Having described my invention, what I claim as new and desire to secure by Letters Patent, is:

1. In a ground gripping chain for automobile tires, the combination with side chains, of cross chains connected thereto, comprising detachable links each of which is provided with a projecting lip adapted to prevent side skidding, and with lips at right angles to the first mentioned lips, which afford traction in backing or going ahead.

2. In a ground gripping chain for automobile tires, the combination with side chains, of cross chains connected thereto, comprising links which are detachably connected one with another, each of said links having portions which are bent at right angles thereto to provide parallel ground engaging members which afford traction, and a portion which is bent over at right angles to present a ground engaging member which stands at right angles to the first mentioned members, and which is adapted to prevent side skidding.

3. In a ground gripping chain for automobile tires, the combination with side chains, of cross chains connected thereto, comprising links, each having a fluked head at one end and an aperture adjoining the other end, the fluked head of one link engaging the margin of the aperture of the adjoining link, whereby the links are detachably hinged, and projecting lips on each of said links, which are disposed at right angles to each other.

4. In a ground gripping chain for automobile tires, the combination with side chains, of cross chains connected thereto, comprising links, each of which has a right angled road engaging lip at one end, a fluked head at the opposite end, right angled road engaging lips on opposite sides thereof, and an aperture which extends partly into the said end lip, the flukes of one link being bent to enter the aperture of the adjoining lip and then flattened to engage the said end lip, whereby the links are detachably connected in hinge relation, and hooks on the extremities of the end links for engaging links of said side chains.

5. In a ground gripping chain for automobile tires, the combination with side chains, of cross chains connected thereto, comprising links, each of which comprises a plate, two opposite side portions and one end portion of which, are bent over to form lips at right angles to the plate, the remaining end portion terminating in a fluke, an opening being formed partly in the plate and partly in the end lip; said links being connected by the engagement of the fluke of one link with the end lip of the succeeding link, after the fluke has been passed through the opening in the succeeding link; each cross chain terminating at one end in a link having parallel side lips, a lip at one end, and a hook at the opposite end for engaging the side chain, the opposite terminal link having a side-chain-engaging hook, parallel side lips, and a fluke for engaging the next succeeding link.

6. In a ground gripping chain for automobile tires, the combination with side chains, of cross-chains connected thereto comprising detachable links each of which is provided with projecting lips disposed in angular relation to each other to prevent side skidding and to afford traction in backing or going ahead.

7. In a ground gripping chain for automobile tires, the combination with side chains, of cross-chains connected thereto comprising links, each having a fluked head at one end and an aperture adjacent the other end, the fluked head of one link engaging the margin of the aperture of the adjoining link, whereby the links are detachably hinged, and projecting lips on each of said links which are disposed in angular relation to each other.

8. In tire chains, a cross-chain comprising a plurality of separably interconnected links each having projecting portions disposed in angular relation to each other, and means for attaching the cross-chains to the side chains.

9. In tire chains, a cross-chain comprising a plurality of links each having a fluked head at one end, an aperture at the other end, lateral projecting portions and a projecting portion adjacent the apertured end angularly disposed relatively to the lateral projecting portions, the fluked head of one link engaging the margin of the aperture of the adjoining link, and means for attaching the cross-chain to the side chains.

In testimony whereof I affix my signature in presence of two witnesses.

JAMES E. ROBISON.

Witnesses:
G. SARGENT ELLIOTT,
ELIZABETH SMITH.